(12) United States Patent
Wang et al.

(10) Patent No.: US 7,657,375 B2
(45) Date of Patent: Feb. 2, 2010

(54) METHOD AND APPARATUS FOR CORRECTING UNDERESTIMATION OF FORMATION ANISOTROPY RATIO

(75) Inventors: Tsili Wang, Katy, TX (US); Alexandre N. Bespalov, Spring, TX (US); Bill H. Corley, Conroe, TX (US); Daniel T. Georgi, Houston, TX (US); Michael B. Rabinovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 204 days.

(21) Appl. No.: 11/740,376

(22) Filed: Apr. 26, 2007

(65) Prior Publication Data

US 2007/0267192 A1 Nov. 22, 2007

Related U.S. Application Data

(60) Provisional application No. 60/794,988, filed on Apr. 26, 2006.

(51) Int. Cl.
*G01V 1/40* (2006.01)

(52) U.S. Cl. .................. 702/6; 73/152.03; 340/853.8; 367/47; 702/7; 702/9

(58) Field of Classification Search .............. 702/6, 702/7, 9, 11, 150, 191; 324/330, 338, 339, 324/343; 73/152.03; 367/47; 340/853.8
See application file for complete search history.

(56) References Cited

U.S. PATENT DOCUMENTS

| | | | | |
|---|---|---|---|---|
| 4,837,517 A | 6/1989 | Barber | ............. | 324/339 |
| 5,157,605 A | 10/1992 | Chandler et al. | ............. | 364/422 |
| 5,452,761 A | 9/1995 | Beard et al. | ............. | 166/250 |
| 5,999,883 A | 12/1999 | Gupta et al. | ............. | 702/7 |
| 6,446,872 B1 | 9/2002 | Imai et al. | ............. | 235/475 |
| 6,470,274 B1 | 10/2002 | Mollison et al. | ............. | 702/7 |
| 6,480,119 B1 | 11/2002 | McElhinney | | |
| 6,493,632 B1 | 12/2002 | Mollison et al. | ............. | 702/2 |
| 6,618,676 B2 | 9/2003 | Kriegshauser et al. | ......... | 702/7 |
| 6,643,589 B2 | 11/2003 | Zhang et al. | ............. | 702/7 |
| 6,686,736 B2 | 2/2004 | Schoen et al. | ............. | 324/303 |
| 6,711,502 B2 | 3/2004 | Mollison et al. | ............. | 702/6 |
| 2002/0113592 A1 | 8/2002 | Omeragic | ............. | 324/339 |
| 2003/0025503 A1 | 2/2003 | Fanini et al. | ............. | 324/339 |
| 2003/0028324 A1 | 2/2003 | Xiao et al. | ............. | 702/7 |
| 2003/0090269 A1 | 5/2003 | Fanini et al. | ............. | 324/339 |

(Continued)

OTHER PUBLICATIONS

T. Wang et al.; "Multicomponent induction response in cross bedding and a weak-anisotropy approximation", SEG Int'l Exposition and 74th Annual Meeting, Oct. 10-15, 2004, pp. 1-4.

(Continued)

*Primary Examiner*—John H Le
(74) *Attorney, Agent, or Firm*—Madan & Sriram, P.C.

(57) ABSTRACT

A method, apparatus and computer-readable medium for evaluating an earth formation includes making measurements with a logging tool having a first depth of investigation in a borehole in the earth formation. A first dip of the formation is estimated using multi-component measurements. The estimated dip is compared with a second dip measurement in the borehole. The results of the comparison are stored on a tangible medium.

27 Claims, 13 Drawing Sheets

U.S. PATENT DOCUMENTS

| | | |
|---|---|---|
| 2003/0146742 A1 | 8/2003 | Gianzero et al. ............ 324/343 |
| 2004/0088114 A1 | 5/2004 | Xiao |
| 2004/0123655 A1 | 7/2004 | MacPherson |
| 2004/0207403 A1 | 10/2004 | Fanini et al. ................ 324/339 |
| 2005/0030037 A1 | 2/2005 | Fanini et al. ................ 324/339 |
| 2005/0044737 A1 | 3/2005 | Choi et al. |
| 2005/0201203 A1 | 9/2005 | Goloshubin et al. |
| 2005/0234647 A1 | 10/2005 | Haugland |
| 2005/0278122 A1 | 12/2005 | Tabarovsky et al. |
| 2006/0132138 A1 | 6/2006 | Pelegri et al. ............... 324/339 |
| 2006/0164092 A1 | 7/2006 | Forgang et al. ............. 324/339 |
| 2006/0208737 A1 | 9/2006 | Merchant et al. ............ 324/330 |
| 2007/0103160 A1 | 5/2007 | Pelegri ....................... 324/339 |
| 2007/0205770 A1 | 9/2007 | Fanini et al. ................ 324/339 |
| 2007/0239360 A1 | 10/2007 | Rabinovich et al. .......... 702/11 |

OTHER PUBLICATIONS

J. D. Klein; "Induction Log Anisotropy Corrections", The Log Analyst, Mar.-Apr. 1993, pp. 18-27.

M. Rabinovich et al.; "Enhanced Anisotropy From Joint Processing of Multi-component and Multi-array Induction Tools", SPWLA 42nd Annual Logging Symposium, Jun. 17-20, 2001, Paper HH, pp. 1-10.

P. F. Worthington; "The Influence of Formation Anisotropy Upon Resistivity—Porosity Relationships", SPWLA Twenty-Second Annual Logging Symposium, Jun. 23-26, 1981, Paper AA, pp. 1-25.

M. Rabinovich et al.; "Processing Multi-Component Induction Data for Formation Dip and Azimuth in Anisotropic Formations", SPWLA 46th Annual Logging Symposium, Jun. 26-29, 2005, pp. 1-14.

J. H. Moran et al.; "Effects of formation anisotropy on resistivity-logging measurements", Geophysics, vol. 44, No. 7, Jul. 1979, pp. 1266-1286.

T. Wang et al.; "Formation Dip, Azimuth, and Anisotropy in More Complex Depositional Environments", SPWLA 47th Annual Logging Symposium, Jun. 4-7, 2006, pp. 1-15.

B. Kriegshauser et al.; "A New Multicomponent Induction Logging Tool to Resolve Anisotropic Formations", SPWLA 41st Annual Logging Symposium, Jun. 4-7, 2000, Paper D, pp. 1-14.

METHOD AND APPARATUS FOR CORRECTING UNDERESTIMATION OF FORMATION ANISOTROPY RATIO

CROSS-REFERENCES TO RELATED APPLICATIONS

This application claims priority from U.S. Provisional Patent Application Ser. No. 60/794,988 filed on Apr. 26, 2006.

BACKGROUND OF THE INVENTION

1. Field of the Invention

The invention is related generally to the use of resistivity measurements for evaluation of earth formations having bedding in which the dip varies away from a borehole.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517 to Barber et al., U.S. Pat. No. 5,157,605 issued to Chandler et al, and U.S. Pat. No. 5,452,761 issued to Beard et al.

In recent years, increasing use has been made of multicomponent resistivity measurements that are responsive to vertical and horizontal resistivities (or, equivalently, conductivities) of anisotropic formations. The terms "horizontal" and "vertical" as commonly used and as used in this document relate to directions that are parallel to and perpendicular to bedding, and the resistivities in these directions are commonly the minimum and maximum in an anisotropic formation.

U.S. Pat. No. 5,999,883 issued to Gupta et al, the contents of which are fully incorporated here by reference, discloses a method for determination of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

U.S. Pat. No. 6,466,872 to Kriegshauser et al. having the same assignee as the present application and the contents of which are fully incorporated herein by reference discloses use of a multi-component logging tool (the 3DEX™ tool of Baker Hughes Incorporated) for determination of anisotropic resistivity parameters of a laminated reservoir. As would be known to those versed in the art, such a laminated reservoir that has layers of different resistivities exhibits transverse isotropy even if the layers themselves are isotropic. Such a multicomponent logging tool has azimuthal sensitivity. Kriegshauser discloses a method of analyzing data from a multicomponent logging tool to determine water saturations of the sand and shale fractions of the reservoir. The model used in Kriegshauser assumes that the anisotropy axis is normal to the bedding plane. Similar models have been assumed in, for example, in U.S. Pat. No. 6,618,676 to Kriegshauser et al., and in U.S. Pat. No. 6,643,589 to Zhang et al.

The 3DEX™ tool has a depth of investigation in the formation that is typically several meters and correspond to large-scale dip and azimuth. In contrast, the dips and azimuths from imaging devices are derived from the property (e.g., resistivity) boundaries of formation beds or laminations. When the beds or laminations are within the resolution of the imaging devices, the dips and azimuths are reliably determined. In contrast, the 3DEX™ measurements are sensitive to the orientation of the formation conductivity tensor. The measurements allow us to accurately determine the dips and azimuths in the absence of bed boundaries, provided there exists measurable formation anisotropy. Hence, in many instances the imaging-derived dips and azimuths may be quite different from the 3DEX™-derived ones. A typical example would be in a thick anisotropic shale layer where the imaging tools may not provide reliable dips and azimuths but the 3DEX™ tool will.

Moreover, the different depths of investigation (DOI) and different vertical resolution of the 3DEX™ measurement and the conventional borehole imaging logs will in some circumstances result in different dips and azimuths. The borehole imaging tools usually have DOIs less than a few centimeters, whereas the 3DEX™ measurement reads meters into the formation. Therefore, the two measurements will read the same angles if the angles do not change significantly from the borehole. When formation angles change laterally, it must be understood how the measurement "averaging" affects the angle data derived from 3DEX™ tool measurements.

The purpose of the present invention is to identify and use multicomponent measurements to characterize geologic formations away from the borehole and/or to compare the results of this characterization with borehole imaging logs.

SUMMARY OF THE INVENTION

One embodiment disclosed herein is a method of evaluating an earth formation. The method includes making measurements with a logging tool having a first depth of investigation in a borehole in the earth formation. A first dip of the formation is estimated using the multicomponent measurements. The estimated dip is compared with a second dip measurement in the borehole. The results of the comparison are stored on a tangible medium. A multicomponent logging tool may be used. The second dip measurement may be a local dip measurement at the borehole that may be made by a borehole resistivity imaging tool, a density imaging tool and/or a gamma ray imaging tool. The second dip measurement may be a measurement made with a multicomponent logging tool having a second depth of investigation different from the first depth of investigation. A ratio of a height of an undulation in the earth formation to a wave length of the undulation may be determined. The method may further include estimating a dip angle of an unconformity in the formation. Measurements made with the multicomponent logging tool may be further used for estimating a horizontal resistivity of the formation, a vertical resistivity of the formation, and/or a dip angle of the formation. The estimated horizontal resistivity and a vertical resistivity may be further used for estimating a formation porosity, a fractional shale volume, a shale resistivity, a coarse-grained fraction of a laminated sequence, and/or a fine-grained fraction of a laminated sequence. The estimated dip angle of the unconformity may be used for drilling an offset well. The method may further include conveying the multicomponent logging tool into the borehole using a wireline, a drilling tubular, or a slickline.

Another embodiment disclosed herein is an apparatus for evaluating an earth formation. The apparatus includes a logging tool having a first depth of investigation, the logging tool being configured to be conveyed in a borehole in the earth formation. The apparatus also includes a processor configured to estimate a first dip angle of the formation using the measurements made by the logging tool, compare the estimated dip with a second dip measurement in the borehole, and store the results of the comparison on a tangible medium. The apparatus may further include an imaging tool configured to make the second dip measurement. The imaging tool may be it resistivity imaging tool, a gamma ray imaging tool and/or a density imaging tool. The multicomponent logging tool may be configured to have a second depth of investigation and provide the second dip measurement. The processor may be further configured to determine the ratio of a height of an undulation in the earth formation to a wave length of the undulation. The processor may be further configured to estimate a dip angle of an unconformity in the formation. The processor may be further configured to use the measurements made with the multicomponent logging tool to estimate a horizontal resistivity of the formation, a vertical resistivity of the formation, and/or a dip angle of the formation. The processor may be further configured to use and estimated horizontal resistivity and vertical resistivity of the formation estimate a formation porosity, a fractional shale on June, a shale resistivity, a coarse-grained fraction of a laminated sequence, and/or a fine-grained fraction of a laminated sequence. The processor may be further configured to use the estimated dip angle of the unconformity for drilling an offset well. The apparatus may further include a conveyance device configured to convey the multicomponent logging tool into the borehole. The conveyance device may be a wireline, a drilling tubular, or a slickline.

Another embodiment disclosed herein is a computer-readable medium for use with an apparatus for evaluating an earth formation. The apparatus includes a multicomponent logging tool configured to be conveyed in a borehole in the earth formation and an imaging device configured to produce an image of the earth formation. The medium includes instructions that enable the processor to compare the estimated dip with a second dip estimated from the image, and store the results on a tangible medium. The medium may include a ROM, an EPROM, an EEPROM, a flash memory, and/or an optical disk.

BRIEF DESCRIPTION OF THE FIGURES

The present invention is best understood with reference to the following figures in which like numbers refer to like components and in which.

DETAILED DESCRIPTION OF THE INVENTION

Figure 1:
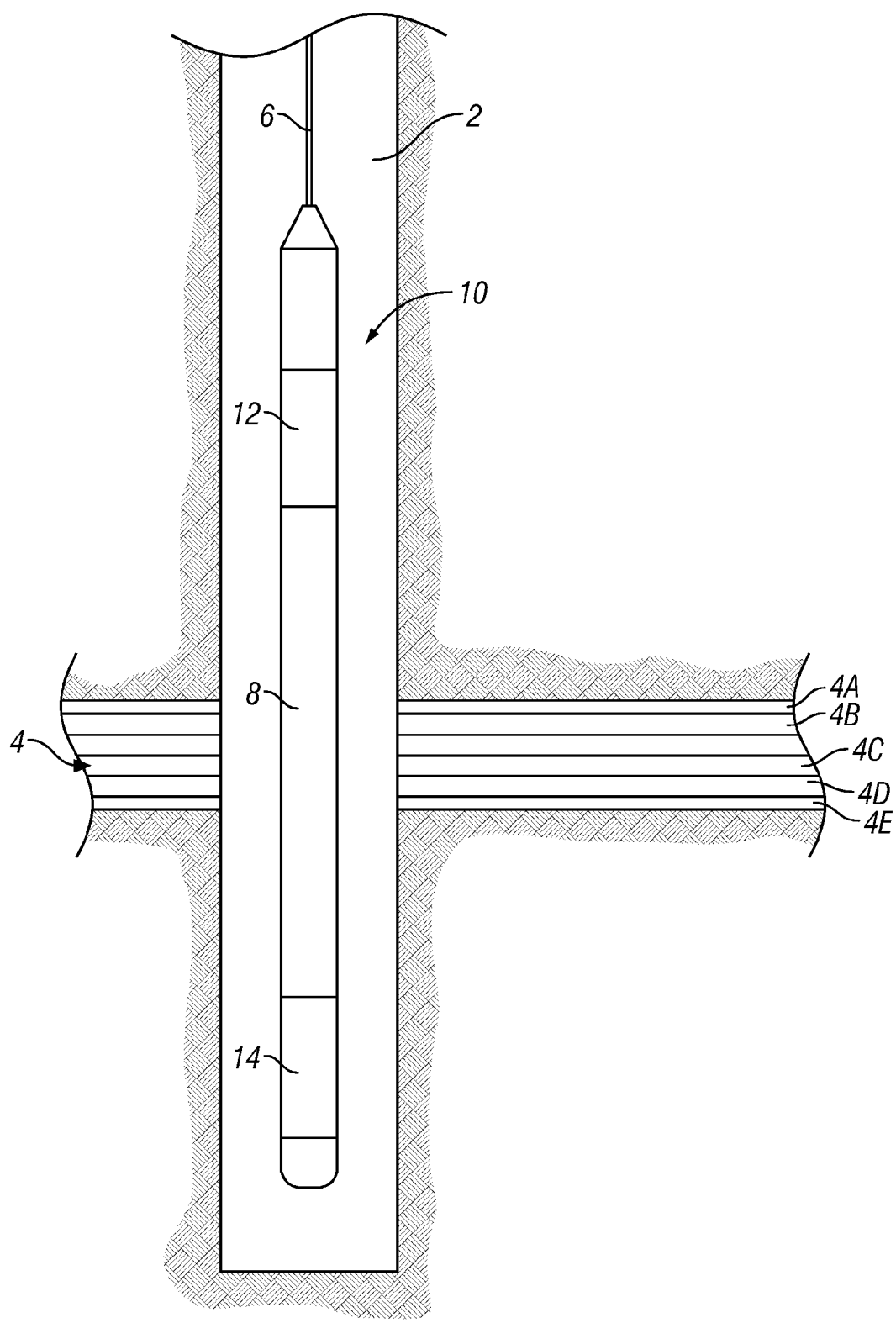
FIG. 1 illustrates an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by use of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8. A processor which controls the operation of the tool and processing acquired data may be part of the electronics unit. Alternatively, some or all of the processing and control may be done by a surface processor.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
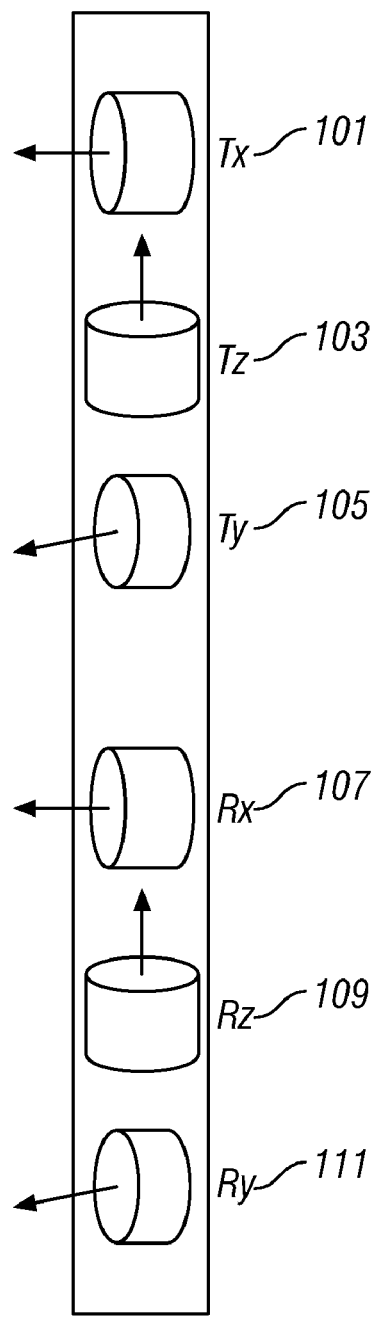
FIG. 2 (prior art) illustrates the arrangement of transmitter and receiver coils in multicomponent induction logging tool marketed under the name 3DEX™.

Referring to FIG. 2, the configuration of transmitter and receiver coils in the 3DEX™ multicomponent induction logging instrument of Baker Hughes is shown. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$, and $H_{xz}$ components are measured, though other components may also be used. It should further be noted that measurements made with other coil inclinations may also be used for the method of the present invention using the well-known principles of coordinate rotation.

Figure 3:
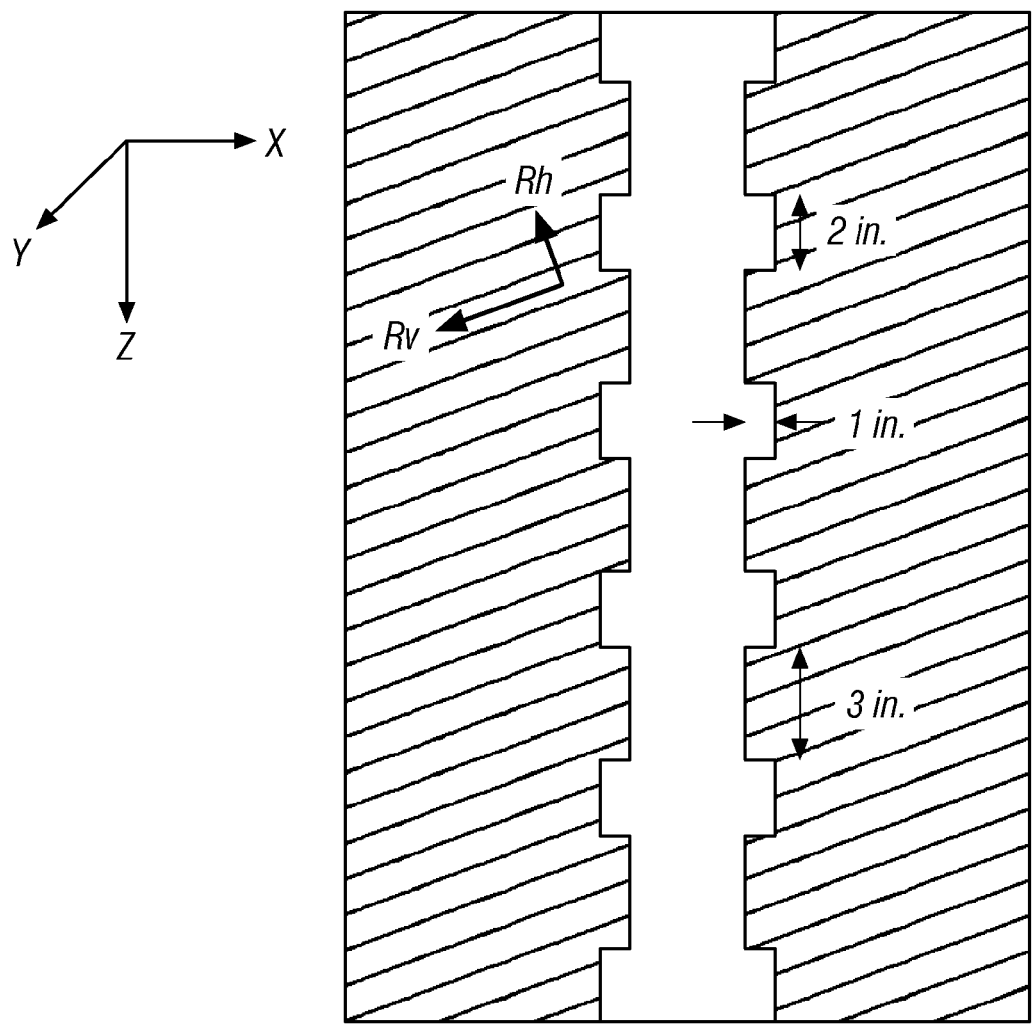
FIG. 3 is a model of a rugose borehole.
Figure 4:
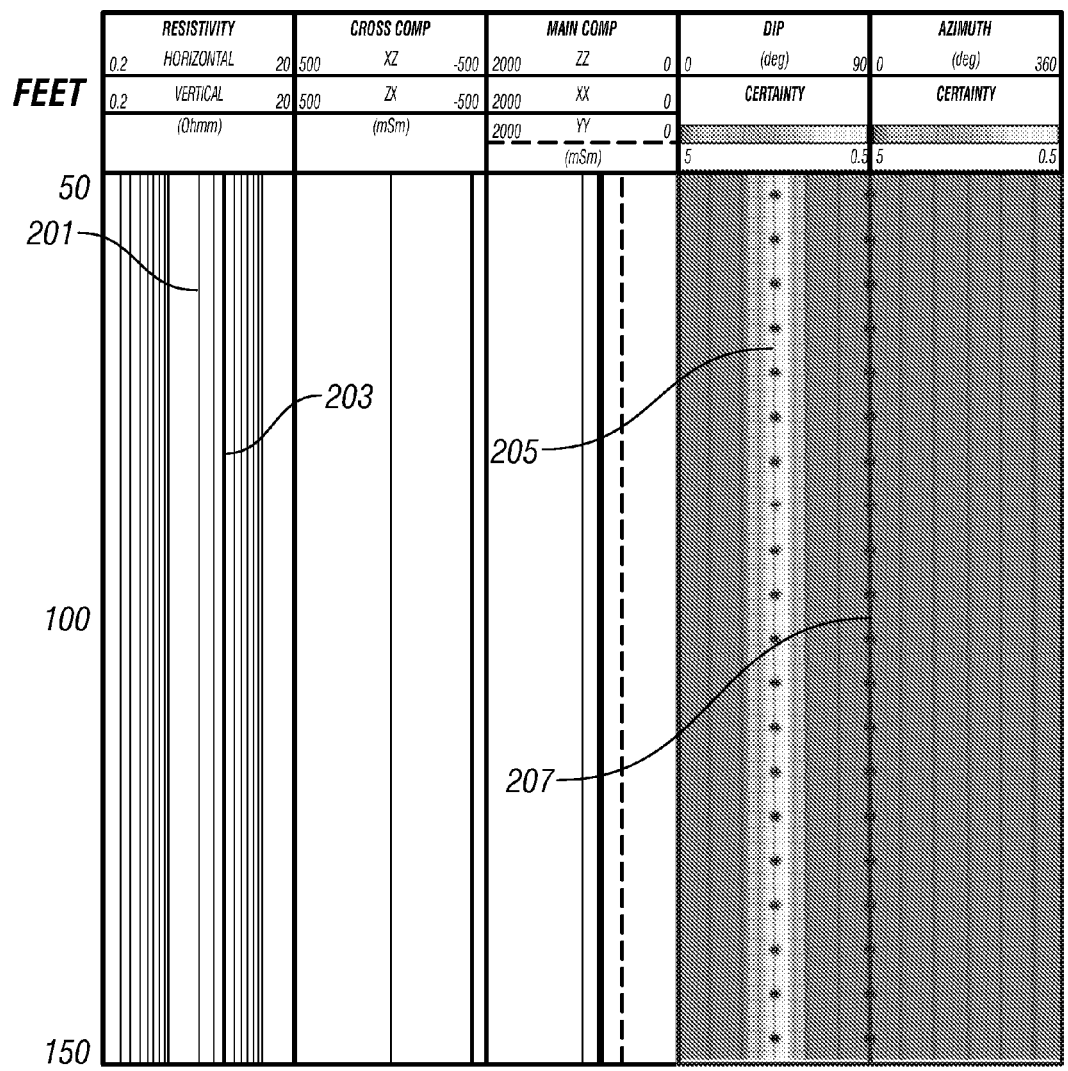
FIG. 4 illustrates the relative insensitivity of 3DEX™ measurements to borehole rugosity.

We first demonstrate the relative insensitivity of measurements made with the 3DEX™ tool to borehole rugosity. A model of a rugose borehole with periodic grooves is shown in FIG. 3. Each groove is 2 in. (5.1 cm) high and 2 in. (5.1 cm) larger than the nominal hole size. The mud resistivity is taken as 0.1 Ω-m for a conductive mud. Also shown in FIG. 3 is the coordinate system used in this document. The 3DEX™ responses and the calculated formation dip, azimuth, and resistivity anisotropy are shown in FIG. 4. The processed horizontal and vertical resistivities are indicated by 201 and 203 respectively while the interpreted dip and azimuth are indicated by 205 and 207 respectively. It is clear that the calculated dip, azimuth, and resistivity anisotropy are not significantly affected by the borehole rugosity. Similar results (not shown) were noted for a resistive mud with a resistivity of 1000 Ω-m.

Figure 5:
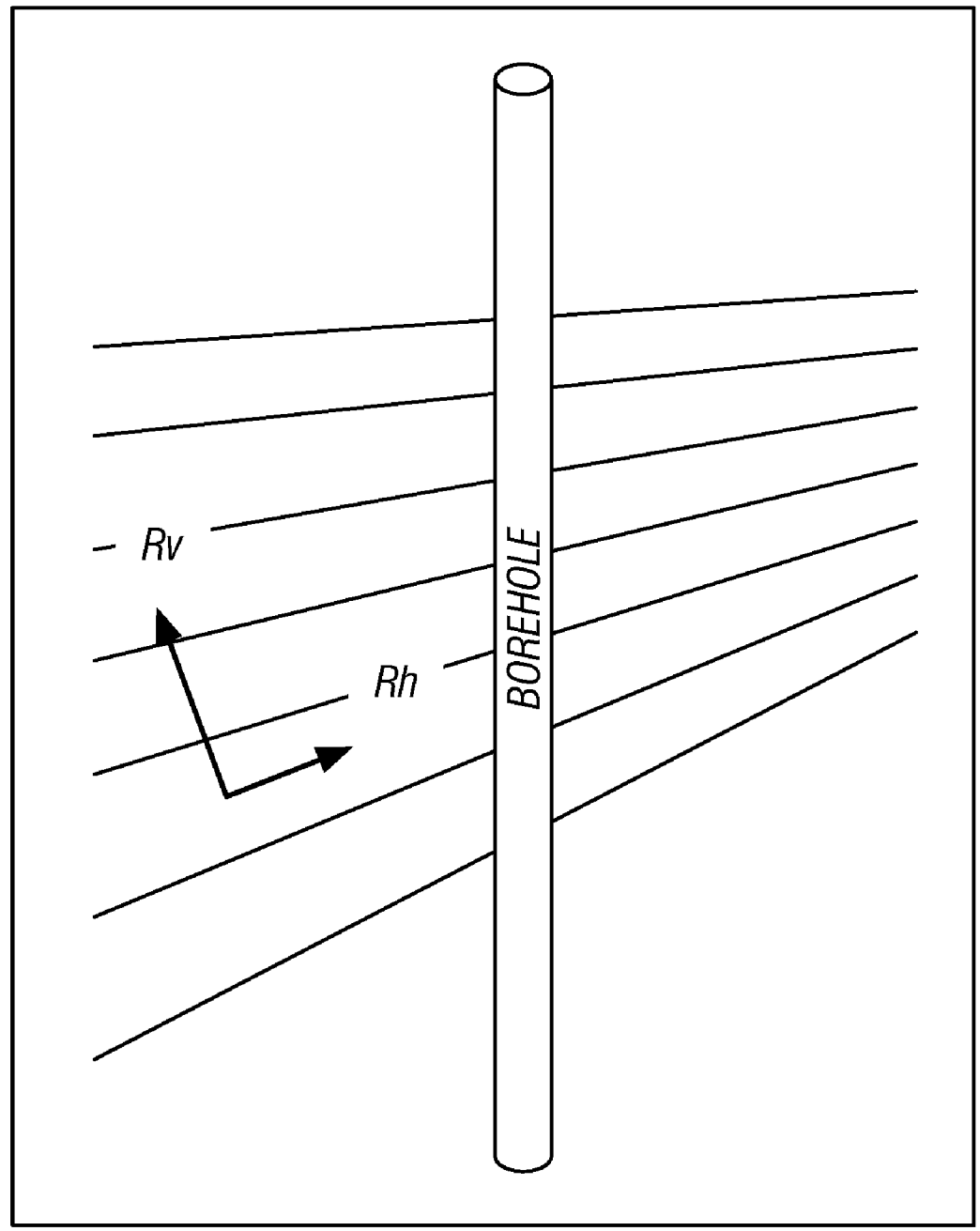
FIG. 5 is a model showing a gradual increase in dip with borehole depth.

Many geologic formations, such as channels, are characterized by a gradual change in dip. To simulate a gradual dip change, we use a model shown in FIG. 5 in which the dip increases by 20° per 100 ft (6.6° per 10 m). The formation is anisotropic with $R_h$ and $R_v$ equal to 1 Ω-m and 4 Ω-m, respectively. The conductivity tensor is tilted according to the local dip angle. Unlike an anisotropic formation with parallel bedding planes, a gradual change in dip causes nonparallel bedding planes. Hence, $R_h$ and $R_v$ measured over a larger volume will be different from those from a smaller volume. In other words, the resistivity anisotropy will be scale-dependent. On the other hand, the resistivity anisotropy for a formation with parallel bedding planes will be scale-independent.

Figure 6:
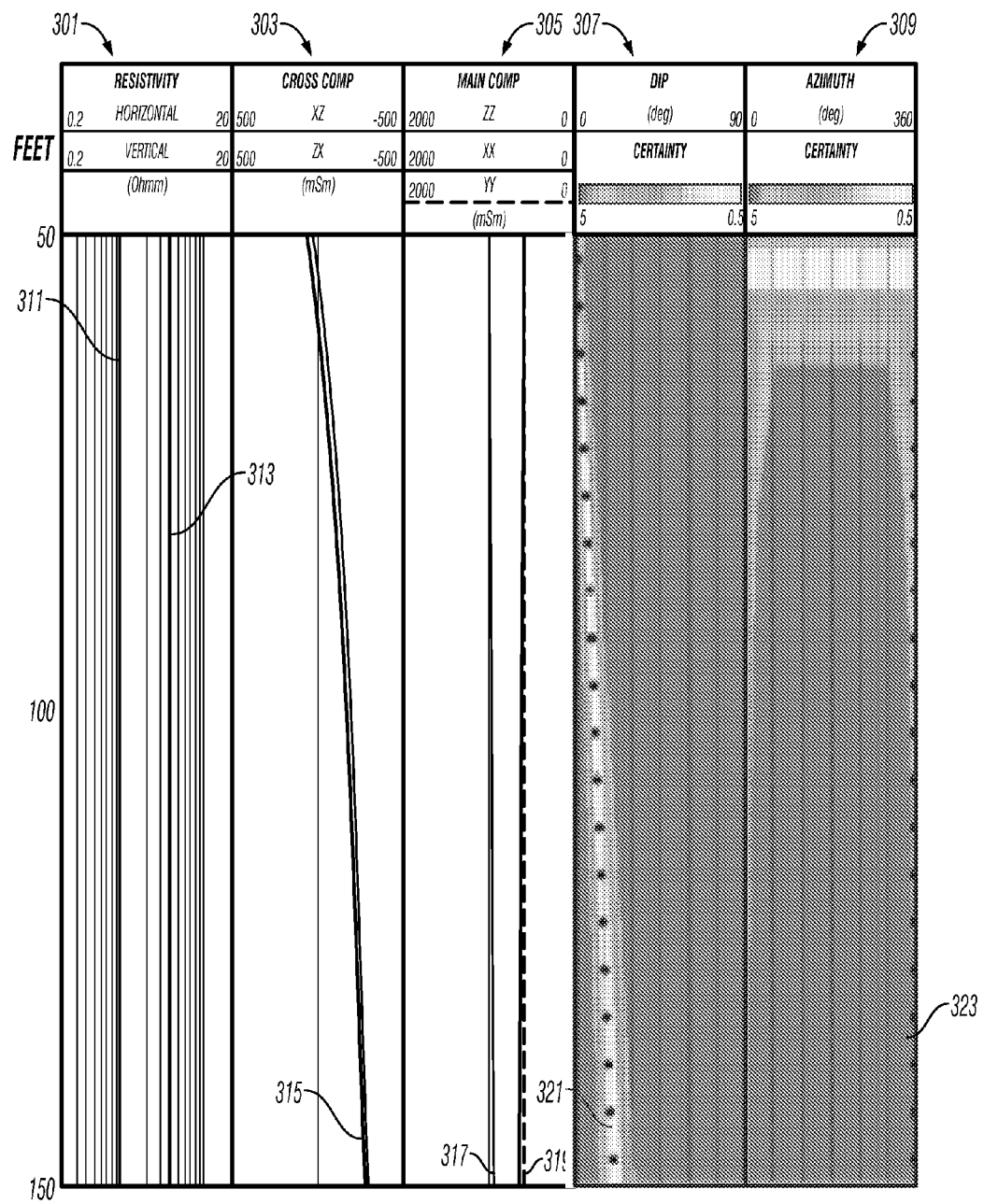
FIG. 6 shows 3DEX™ measurements and estimated formation parameters for the model used in FIG. 5.

Shown in FIG. 6 are the displays of the cross-component measurements (track 303) the main-component measurements (track 305), the processed resistivities (track 301), the processed formation dip (track 307) and the processed formation azimuth (track 309). The zx and xz measurements 315 in track 303 are very similar while the zz measurement 317 in track 305 is clearly separated from the xx and yy measurements 319 in track 305. $R_h$ and $R_v$ are shown by 311 and 313 respectively in track 301. The dip and azimuth angles derived from the main and cross-component 3DEX response are shown by 321 and 323 respectively. As can be seen, both the dip 321 and azimuth angles 323 are accurately estimated. The dip angle increases linearly from 0° at the top to 20° at the bottom, as in the input model. The local resistivity anisotropy is also accurately calculated. In FIG. 6, the cross-components 315 increase (in magnitude) steadily as the dip angle increases. As will be discussed further below, the yy response does not change over the entire depth range because the dip does not change in the y-direction (out of the paper). The zz apparent conductivity decreases slightly as the dip increases, whereas the xx response increases slightly. These variations are easily understood from the xx and zz dependence on the effective conductivities in a dipping, anisotropic formation. This is discussed further below.

Figure 7:
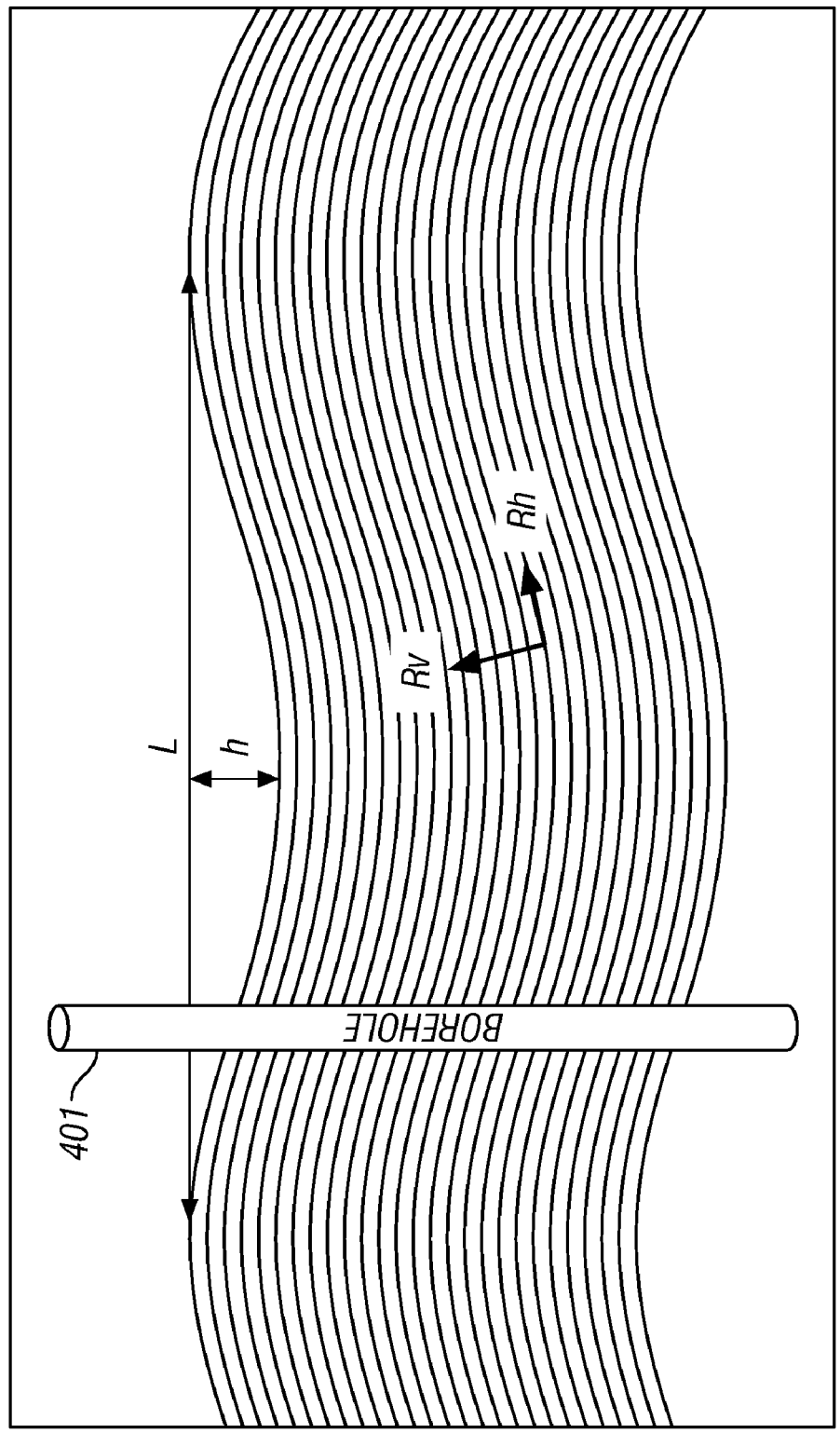
FIG. 7 is an undulating model representing a geologic formation.

Turning now to FIG. 7, a borehole 401 is shown in a geologic formation that has spatial variations in bedding direction away from the borehole but with little change in bed thickness. Such geologic formations are commonly observed in turbidite deposits. These are sedimentary deposits formed by turbidity currents in deep water at the base of the continental slope and on the abyssal plain. In this document, we approximate such a geologic formation by a sinusoidal wave. The peak-to-trough height is given by h and the wavelength is L. We examine a case where the formation is anisotropic with the local $R_h$ and $R_v$ being 1 Ω-m and 4 Ω-m, respectively. For this type of formations, the dip angles derived from the 3DEX™ log may or may not agree with those from image logs, depending on the wavelength of the sine wave. The imaging-derived angle reflects the formation angle along the well trajectory. The 3DEX™ derived angle, on the other hand, represents an average angle over a larger volume characterized by the tool's DOI. It is clear that when the wavelength is significantly smaller than the tool's DOI, the 3DEX™ dip angle should measure a mean formation dip and have little dependence on the location of the well trajectory. If the wavelength is well beyond the tool's DOI, the calculated dip will reflect the locally averaged dip centered on the wellbore. In this case, the calculated dip will depend on the location of the well path in a manner similar to that of the image log-derived angle data. In between the two extreme cases, the 3DEX™ dip angle will be some average of the mean dip and the local dips. Thus, by comparing local dip measurements, such as those made by an imaging device, with dip estimates from 3DEX™ measurements, it is possible to infer the spatial variation of formation dips away from the borehole.

In FIG. 7, we assume the mean dip is 0°. The well is vertical and located at the maximum dip part of the formation. The maximum dip is given by $$\theta_{\max} = \tan^{-1}\left(\frac{\pi h}{L}\right). \tag{1}$$

Figure 8:
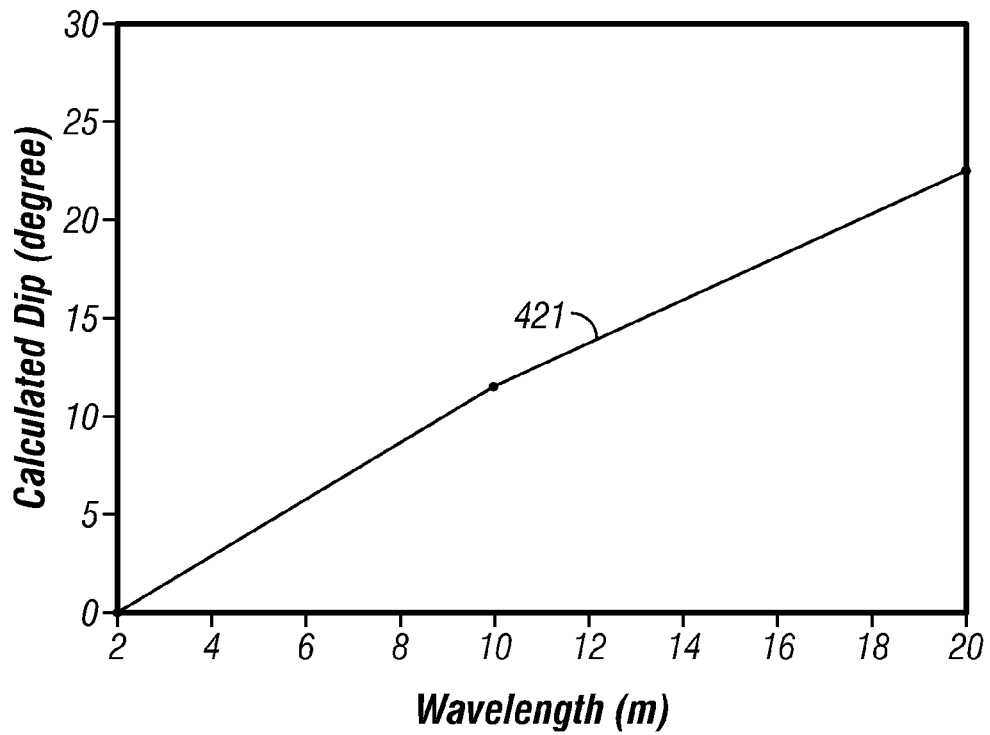
FIG. 8 shows formation dips calculated from 3DEX™ logs for an undulating bed model of FIG. 7.

We will consider three different wavelengths: 2 m, 10 m, and 20 m. In all the three cases, we keep the maximum dip angle the same at 25°. To do so, we let the undulation height h be 0.3 m, 0.75 m, and 1.5 m, respectively. The calculated dips are shown in FIG. 8 by 421. The abscissa is wavelength and the ordinate is the estimated dip. As expected, the calculated dip for L=2 m approaches the mean dip (0°) of the formation because the undulation wavelength is substantially smaller than the DOI of the tool. When L=20 m, the calculated dip is approximately 23°, close to the local dip of 25° at the borehole trajectory. The calculated $R_h$'s in all the cases are the same as the true values. The $R_v$'s vary by less than 12%. This example demonstrates that when the undulation height is relatively small compared to the wavelength, the true $R_h$ and $R_v$ can be determined from the 3DEX logs.

When the undulation height is large, the model will be more similar to a slump in a deepwater environment. We anticipate that higher-amplitude undulations will reduce the effective anisotropy of the formation. To demonstrate, we let L=h=2 m and L=h=0.3 m. In both cases, the calculated $R_v/R_h$ ratio is reduced to approximately 2 as compared to the true ratio of 4. More importantly, the effective anisotropy now dips at 90°. In fact, the equivalent resistivities of an undulating bed in the horizontal (x-) and vertical (z-) directions can be estimated from the periodicity of the bed. The local conductivities at any point in the medium are given by $$\sigma_x = \sigma_h \cos^2\theta + \sigma_v \sin^2\theta \quad (2),$$

and $$\sigma_z = \sigma_h \sin^2\theta + \sigma_v \cos^2\theta \quad (3),$$

where θ is the local dip of the sine wave $$\theta = \tan^{-1}\left(\frac{\pi h}{L}\cos\frac{2\pi x}{L}\right), \quad (4)$$

and x varies between 0 and 1. The equivalent resistivity in the x-direction is approximated by $$R_x^{eq} = \frac{1}{D}\int_0^D \frac{1}{\sigma_x}dx, \quad (5)$$

with D being the DOI of the 3DEX tool. The equivalent resistivity in the z-direction is given by $$R_z^{eq} = \left(\frac{1}{D}\int_0^D \sigma_z dx\right)^{-1}. \quad (6)$$

When L is significantly smaller than the tool's DOI, the quantity D in Eqns (5) and (6) can be replaced with L. Using Eqns (3) and (4), we calculate, for L=h=2 m, $R_x^{eq}$=2.4 Ω-m, and $R_z^{eq}$=1.3 Ω-m. These values are very close to those inverted from the 3DEX responses (2.3 and 1.2 Ω-m, respectively). It can also be seen from in Eqns (5) and (6) that when h>>L/2, the anisotropy of an undulating bed will collapse, i.e., the equivalent horizontal and vertical resistivities will be approximately the same. This is true regardless of $R_h$ and $R_v$ values. Thus, by making measurements with the 3DEX™ tools with different depths of investigation, it is possible to estimate a ratio of the height of undulations to the wavelength of the undulations.

Figure 9:
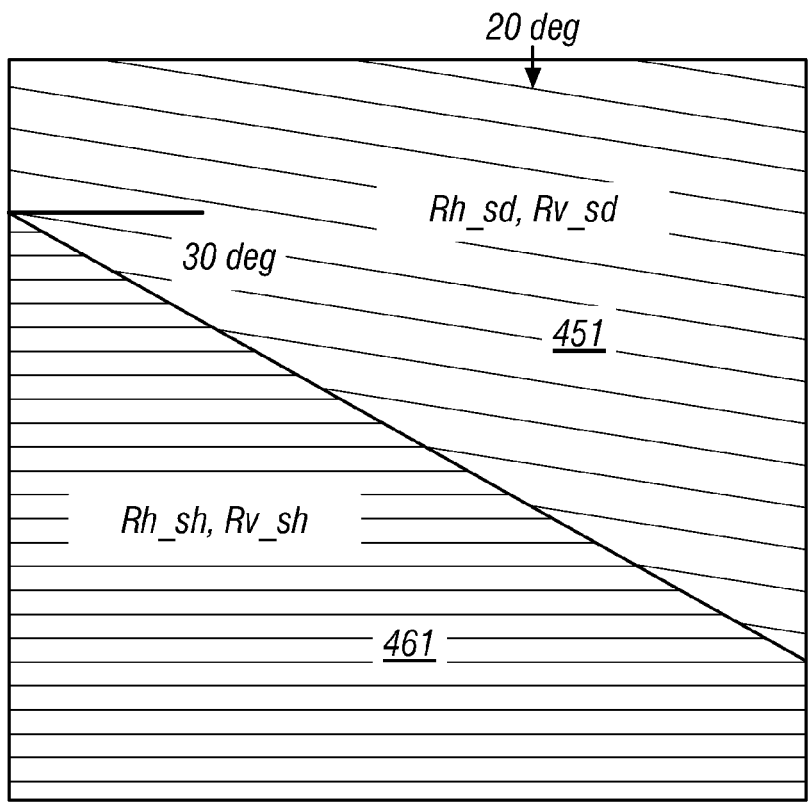
FIG. 9 illustrates cross-bedding at the boundary of a channel sand in a shale layer.

Geologic formations may include channel sands that commonly cut into and through preexisting sediments, causing lithological and typically a bedding angle offset. The channel boundary between the channel sands and the pre-existing sediments is generally not parallel and, therefore, the interpretation of dip from 3DEX™ is much more difficult than for a set of layered planar beds. In FIG. 9, both the channel sand 451 and the underlying formation 461 can be anisotropic and have different dip angles. The base of the sand defines an unconformity surface. In the example shown, the channel sand has dip at 20° to the right. The underlying formation is assumed to be horizontal. The boundary between the sand and the underlying formation dips at 30° to the right. Four different cases will be considered, as listed in Table 1.

To facilitate the analysis, we define a quantity, S, called the shoulder influence distance. S is the distance measured along the wellbore from a bed boundary at which the remote (shoulder) bed will have a negligible (less than 10%) effect on the interpreted formation parameters. We anticipate that the S value will be different for different parameters. Hence, we let $S_{Rh}$, $S_{Rv}$, S, and $S_j$ be the shoulder influence distances for the $R_h$, $R_v$, dip, and azimuth, respectively.

TABLE I

Four different Examples of a sand channel

|  | Rh, sd = 10Ω-m<br>Rv, sd = 10Ω-m | Rh, sd = 5Ω-m<br>Rv, sd = 10Ω-m |
|---|---|---|
| Rh, sh = 1Ω-m<br>Rv, sh = 2Ω-m | Case I | Case II |
| Rh, sh = 1Ω-m<br>Rv, sh = 4Ω-m | Case III | CaseIV |

Figure 10:
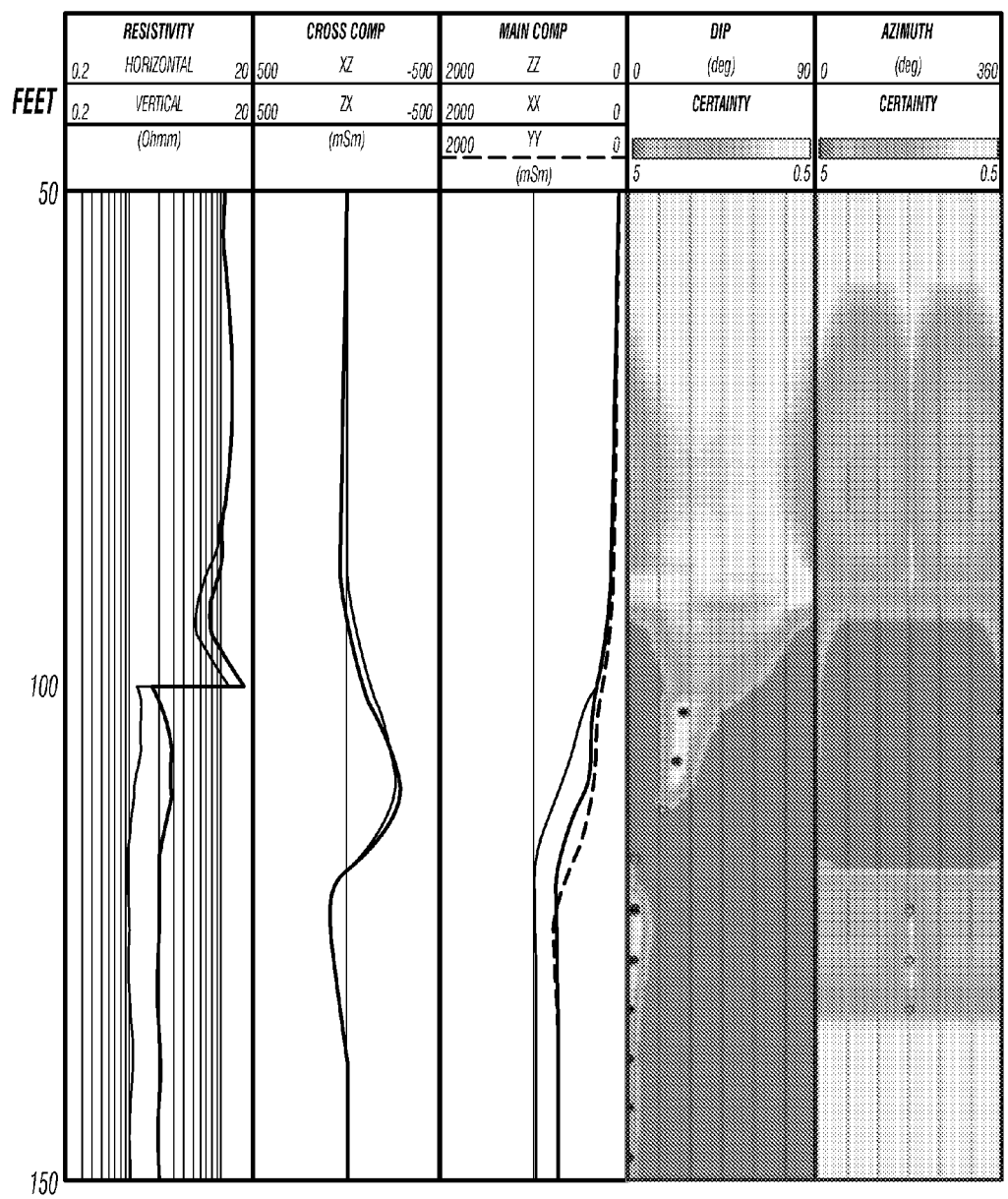
FIG. 10 shows the main and cross-component responses and the derived horizontal and vertical resistivities, dip and azimuth for Case I of a channel sand.

In Case I, the sand is isotropic; hence its dip is not defined. The underlying formation dips at 0°. As FIG. 10 shows, the data starts to reflect the influence of the underlying formation as far as 38 ft from the sand boundary 401 when the tool approaches the boundary from above the sand boundary. In other words, $S_{Rh}$ and $S_{Rv}$ both are approximately 38 ft. However, significant changes in the calculated resistivities occur only when the tool comes within 20 ft from the sand boundary. After penetrating the boundary, the tool reads the true $R_h$ and $R_v$ of the underlying formation as long as the tool is approximately 12 ft and 16 ft from the boundary, respectively. The channel boundary causes the calculated resistivities to undershoot immediately right above the boundary and overshoot below the boundary. The boundary location is indicated by the sharp changes in the calculated $R_h$ and $R_v$ 404. In reality, measurement noises or a transitional resistivity profile may smear the sharp resistivity changes, making identification of the channel boundary less straightforward.

Dip angles are accurately calculated for the underlying formation when the tool is beyond a shoulder influence distance of S=15 ft. It is to be noted that the dip of the channel boundary also seems well resolved. The calculated dip angle 407 is approximately 27°, close to the true dip of 30°. This example shows that as long as there is sufficient resistivity contrast across a channel boundary, the dip of the boundary (unconformity) may be obtained from the 3DEX logs even in the presence of unconforming beds above and/or below the boundary.

Figure 11:
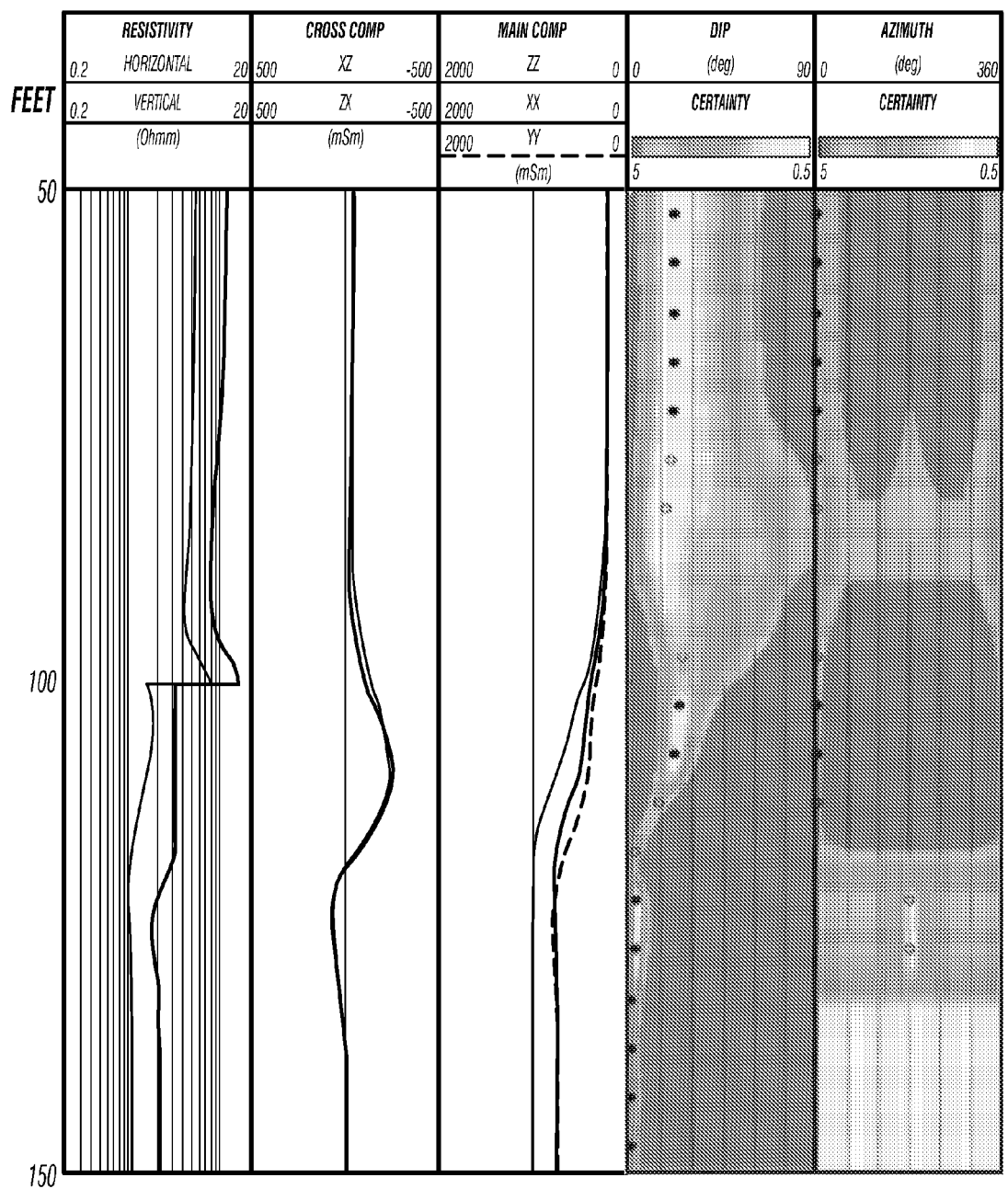
FIG. 11 shows the main and cross-component responses and the derived horizontal and vertical resistivities, dip and azimuth for Case II of a channel sand.

Case II is similar to Case I, except that the sand now is anisotropic. Near the sand boundary are three different dips involved—the dip of the sand, the dip of the underlying formation, and the dip of the channel boundary. The simulation results shown in FIG. 11 indicate that the dips of both the sand and the underlying formation are accurately derived when the tool is beyond the respective shoulder influence distances of $S_\theta$=25 ft and 18 ft. The calculated dip (23°) of the channel boundary is a reasonable estimate of the true dip. The shoulder influence distances for the sand $R_h$ and $R_v$ are $S_{Rh}$=19 ft and $S_{Rv}$=29 ft respectively. For the underlying formation, $S_{Rh}$=16 ft and $S_{Rv}$=29 ft.

Figure 12:
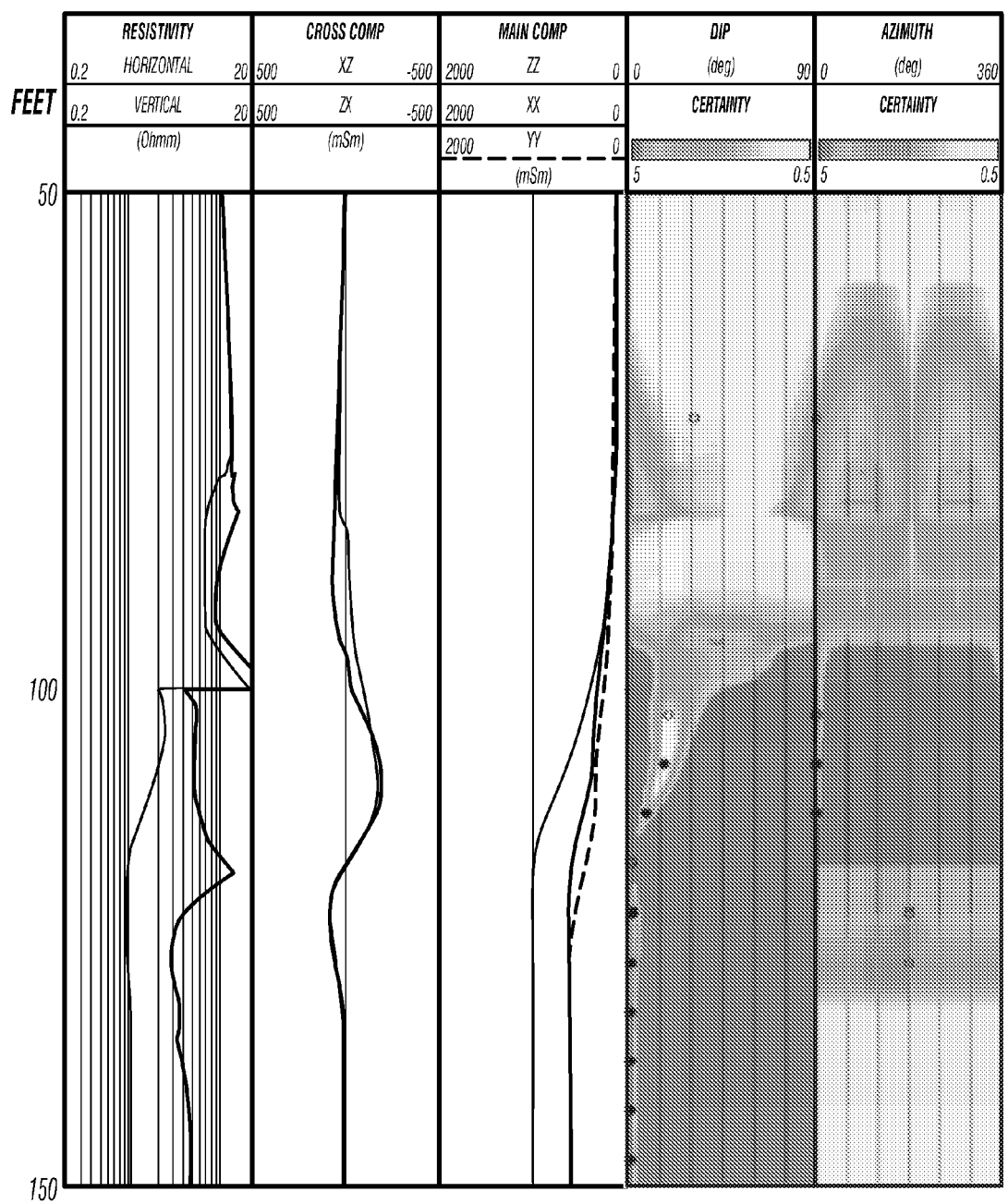
FIG. 12 shows the main and cross-component responses and the derived horizontal and vertical resistivities, dip and azimuth for Case III of a channel sand.

Case III is similar to Case I, except that the $R_v$ of the underlying formation is increased from 2 Ω-m to 4 Ω-m. The anisotropy ratio is also increased to 4. As FIG. 12 shows, the shoulder bed effect of the sand body on the underlying formation response becomes stronger due to the overall reduced resistivity of the underlying formation. For the underlying formation, $S_{Rh}$=15 ft, $S_{Rv}$=38 ft, respectively. This example shows that $R_h$ and $R_v$ of an anisotropic formation may be resolved differently. Because the $R_v$ is always greater than the $R_h$, the $R_h$ is usually better resolved by an induction tool. The dip angle seems less affected by the shoulder bed effect. The calculated dip for the underlying formation approaches the true dip angle (0°) when the measurements are within 18 ft or less of the boundary. The dip angle for the sand boundary is approximately 20°, substantially lower than the true dip of 30°.

Figure 13:
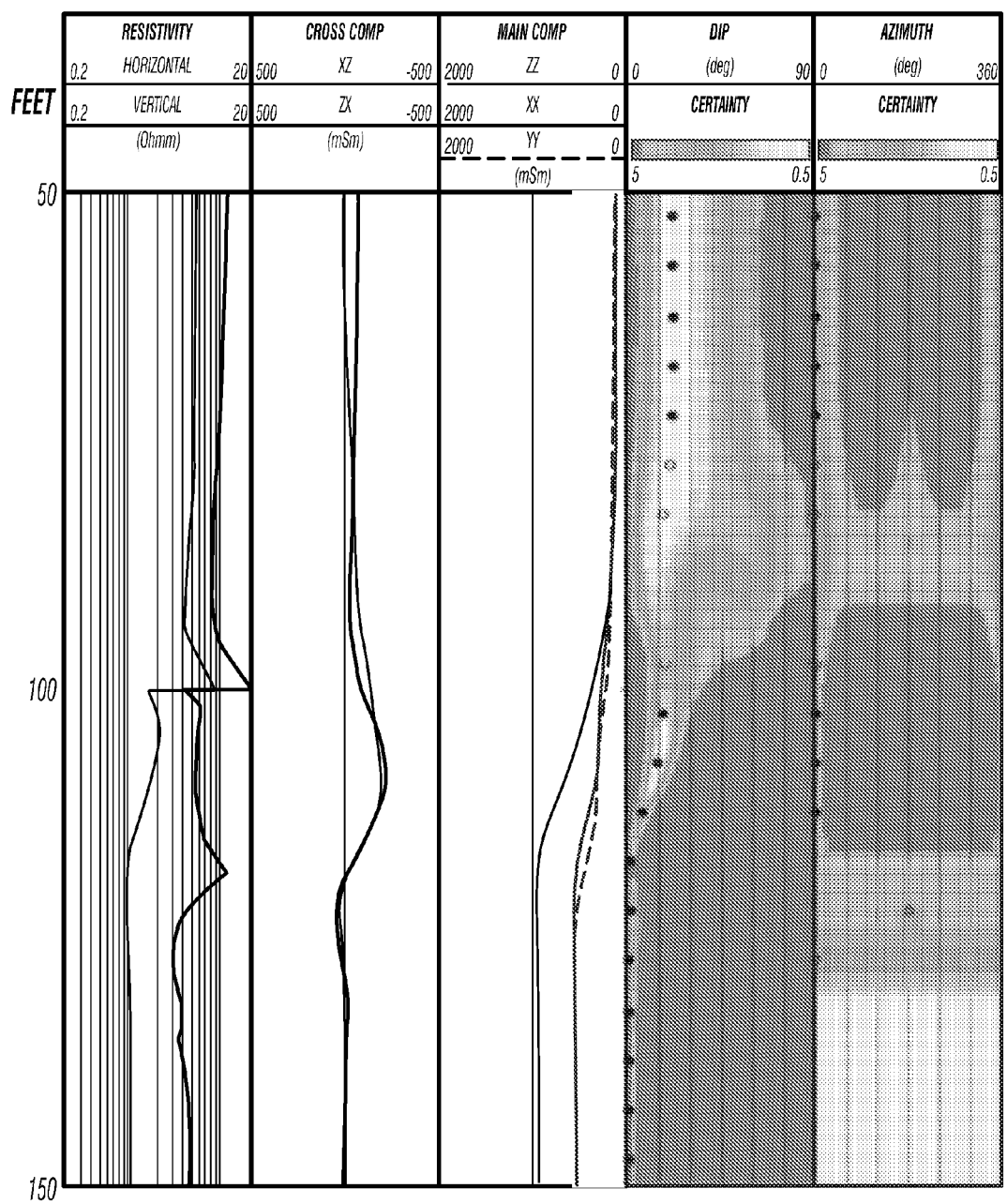
FIG. 13 shows the main and cross-component responses and the derived horizontal and vertical resistivities, dip and azimuth for Case IV of a channel sand.

For Case IV, both the sand and the underlying formation are anisotropic. The anisotropy ratios are 2 and 4, respectively. We expect the reduced overall resistivity contrast across the channel boundary will present additional difficulty to the determination of the boundary dip. All these are confirmed in FIG. 13. The calculated dip shows smooth transition from 20° in the sand to 0° in the underlying formation. The dip at the channel boundary is approximately 17°, well below the true dip of 30°.

Table 2 summarizes the shoulder influence distances for all the four cases. We conclude that the $R_h$ is generally less influenced by a channel boundary than the $R_v$. The dip of either formation (sand or underlying bed) can be accurately calculated when the $R_h$ is well resolved.

TABLE 2

Shoulder influences for channel example

| Case | Tool in sand (more resistive) | | | Tool in underlying formation (more conductive) | | |
|------|------|------|------|------|------|------|
|      | $S_{Rh}$ | $S_{Rv}$ | $S_\theta$ | $S_{Rh}$ | $S_{Rv}$ | $S_\theta$ |
| I    | 38 | 38 | N/A | 12 | 16 | 15 |
| II   | 19 | 29 | 25  | 16 | 29 | 18 |
| III  | 38 | 38 | N/A | 15 | 38 | 18 |
| IV   | 18 | 30 | 17  | 15 | 35 | 16 |

The Weak Anisotropy Approximation

In this section, we explain the main-component response behavior in FIG. 7 using a weak-anisotropy approximation theory disclosed in U.S. patent application Ser. No. 11/321,497 of Wang et al, having the same assignee as the present invention and the contents of which are fully incorporated herein by reference. The zz component responds largely to the effective conductivity in a plane normal to the tool (z-) axis and the xx component to the effective conductivity in a plane normal to the x-axis. The effective conductivities in the tool coordinate system can be derived by first rotating the conductivity tensor from the formation coordinate system to the tool coordinate system and then using Worthington's (1981) conjecture.

By assuming a local dip angle θ toward the x-direction, one can rotate the conductivity tensor from the formation coordinate system to the tool coordinate system as $$\sigma^* = \begin{bmatrix} \sigma_{11}^* & 0 & \sigma_{13}^* \\ 0 & \sigma_{22}^* & 0 \\ \sigma_{31}^* & 0 & \sigma_{33}^* \end{bmatrix}, \quad (7)$$

where $$\sigma_{11}^* = \sigma_h\cos^2\theta + \sigma_v\sin^2\theta \quad (8)$$
$$\sigma_{22}^* = \sigma_h$$
$$\sigma_{33}^* = \sigma_h\sin^2\theta + \sigma_v\cos^2\theta$$
$$\sigma_{13}^* = \sigma_{31}^* = (\sigma_h - \sigma_v)\sin\theta\cos\theta.$$

In the above equations, $\sigma_h$ and $\sigma_v$ are the conductivities parallel and normal to the local bedding planes, respectively. The subscripts 1, 2, and 3 represent the x-, y-, and z-directions, respectively, in the tool coordinate system.

We replace the rotated conductivity tensor with a biaxial anisotropy system under the weak anisotropy approximation as $$\sigma^* \approx \begin{bmatrix} \sigma_{11}^* & 0 & 0 \\ 0 & \sigma_{22}^* & 0 \\ 0 & 0 & \sigma_{33}^* \end{bmatrix} \quad (9)$$

For eqn. (9) to be valid, $$\left|\frac{\sigma_{13}^*}{\sigma_h}\right| = \left(1 - \frac{\sigma_v}{\sigma_h}\right)|\sin\theta\cos\theta| < \varepsilon, \quad (10)$$

where ε is a small positive number.

To estimate the multicomponent induction response to a biaxially anisotropic formation, we further replace Eqn. (9) with an equivalent transversely isotropic (TI) medium. As shown by Wang, the equivalent TI tensor will be different for the different field components but all of them are derived from Worthington's (1981) conjecture. For the zz component, the effective TI tensor is:

$$\sigma_{TI}^{zz} = \begin{bmatrix} \sqrt{\sigma_{11}^*\sigma_{22}^*} & 0 & 0 \\ 0 & \sqrt{\sigma_{11}^*\sigma_{22}^*} & 0 \\ 0 & 0 & \sigma_{33}^* \end{bmatrix}. \quad (11)$$

The Equivalent TI tensors for the xx and the yy components are:

$$\sigma_{TI}^{xx} = \begin{bmatrix} \sigma_{22}^* & 0 & 0 \\ 0 & \sigma_{22}^* & 0 \\ 0 & 0 & \sigma_{33}^* \end{bmatrix}, \quad (12)$$

and $$\sigma_{TI}^{yy} = \begin{bmatrix} \sigma_{11}^* & 0 & 0 \\ 0 & \sigma_{11}^* & 0 \\ 0 & 0 & \sigma_{33}^* \end{bmatrix}. \quad (13)$$

From Eqns (11)-(13) we can calculate the multifrequency focused zz, xx, and yy responses for the effective TI medium using the equations given by Rabinovich and Tabarovsky (2001)

$$\sigma_{zz}^{MFF} = \sqrt{\sigma_{11}^* \sigma_{22}^*},\quad (14)$$

$$\sigma_{xx}^{MFF} \approx \left[\frac{3}{4}\left(1 + \frac{\sigma_{33}^*}{\sigma_{22}^*}\right)\right]^{2/3} \sigma_{22}^*,\quad (15)$$

and $$\sigma_{yy}^{MFF} \approx \left[\frac{3}{4}\left(1 + \frac{\sigma_{33}^*}{\sigma_{11}^*}\right)\right]^{2/3} \sigma_{11}^*.\quad (16)$$

In fact, the equivalent horizontal conductivity for the ZZ response in Eqn (11) given by Worthington's (1981) conjecture is strictly true, regardless of the dip angle and anisotropy (Moran and Gianzero (1979). As a first-order approximation, we use Eqns (14)-(16) to predict the zz, xx, and yy responses in an anisotropic formation with a gradual dip change. Specifically, multifrequency focusing is used to give the focused xx, yy and zz conductivities. Eqns. (14)-(16) can then be solved to give $\sigma^*_{11}$, $\sigma^*_{22}$ and $\sigma^*_{33}$. Eqn (8) can then be solved to give $\sigma_h$, $\sigma_v$ and $\theta$. If the determined $\theta$ is different from a local dip angle measured at the borehole, it is an indication that the dip angle is varying away from the borehole or that the weak anisotropy assumption is not valid. The invalidity of the weak anisotropy assumption is readily checked using eqn. (10).

Figure 14:
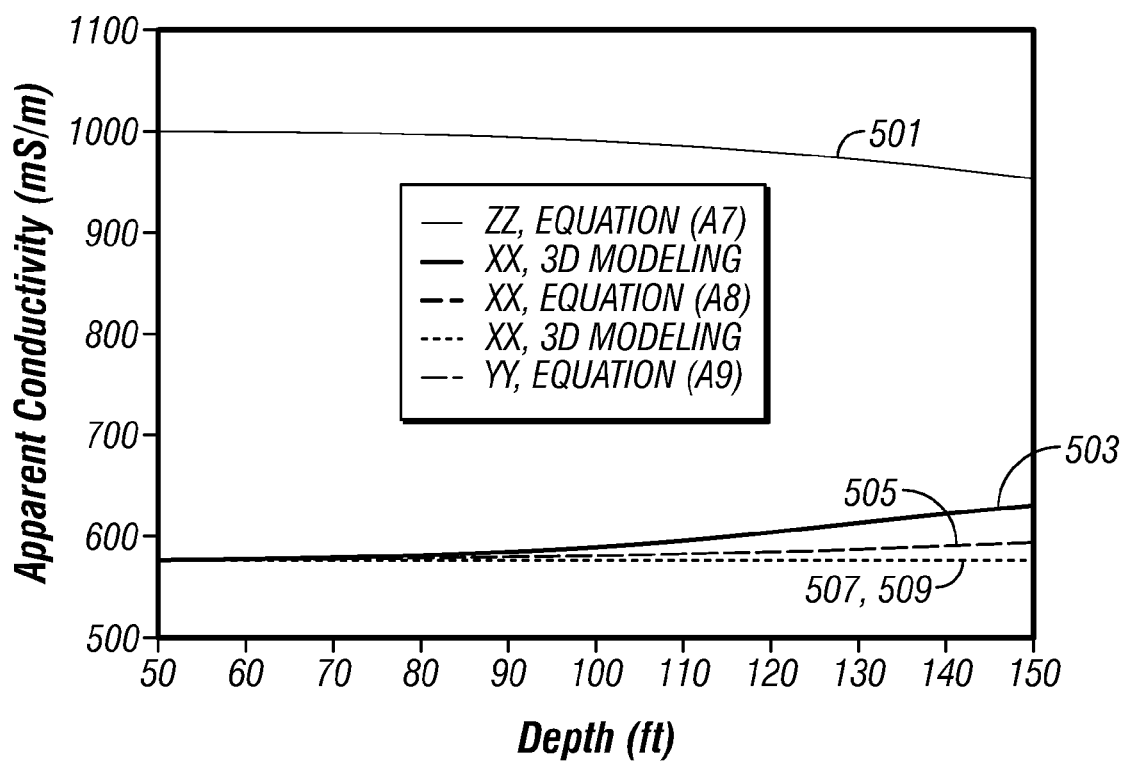
FIG. 14 shows variations of the principal component measurements for the model of FIG. 7.

FIG. 14 compares the predicted apparent conductivities to those from FIG. 6 by assuming the bedding planes are locally parallel. 501 gives the zz component as a function of depth. 503 and 505 show the xx components from 3-D modeling and from eqn. (15). 507, 509 are indistinguishable and give the yy component from 3-D modeling and eqn. (16) respectively. Clearly, Eqns (15) and (16) accurately predict the MFF processed xx and yy apparent conductivity responses. The zz component is not compared because Eqn (14) is strictly true. Eqns (15) and (16) maybe used to give reasonable prediction results when the anisotropy ratio is less than about 5 and the relative dip angle is less than about 30°. A more useful application of the weak-anisotropy approximation is to a layered medium in which the layers are anisotropic and may have different dip angles as in a cross-bedded formation. In this case, each anisotropic layer is approximated with an equivalent TI medium with a 0° relative dip to the layer boundaries. The resultant formation can be readily modeled as a 1-D TI medium.

Once the cross-bedding resistivity parameters have been determined, further processing may be done to determine petrophysical parameters characterizing the cross-bedding using known methods. Determination of water saturation and of fractional volumes of sand and shale components is discussed, for example, in U.S. Pat. Nos. 6,711,502, 6,493,632 and 6,470,274 to Mollison et al, having the same assignee as the present invention.

Mollison '274 teaches determination of the total porosity of a formation, a fractional volume of the shale, water saturation, and a resistivity of the shale in a laminated reservoir including sands that may have dispersed shales therein. A tensor petrophysical model determines the laminar shale volume and laminar sand conductivity from vertical and horizontal conductivities derived from multi-component induction log data. NMR data are used to obtain measurements of the total clay-bound water in the formation and the clay bound water in shales in the formation. Mollison '502 teaches determination of the total porosity of a formation, a fractional volume of the shale, and a resistivity of the shale in a laminated reservoir including sands that may have dispersed shales therein. A tensor petrophysical model determines the laminar shale volume and laminar sand conductivity from vertical and horizontal conductivities derived from multi-component induction log data. The volume of dispersed shale and the total and effective porosities of the laminar sand fraction are determined using a Thomas-Stieber-Juhasz approach. Removal of laminar shale conductivity and porosity effects reduces the laminated shaly-sand problem to a single dispersed shaly-sand model to which the Waxman-Smits equation can be applied.

In one embodiment of the invention, use is made of the method taught in U.S. Pat. No. 6,686,736 to Schoen et al., having the same assignee as the present invention and the contents of which are incorporated herein by reference. Taught therein is a method for determining the coarse- and fine-grained fraction of a laminated sequence and estimation of permeabilities of the coarse- and fine-grained components.

It should further be noted that the angular unconformity may be used for the drilling of additional developmental wells. A large angle of unconformity is indicative of being at a large distance from the center of a deep channel. This would be diagnostic of a larger reservoir than one in which the angular unconformity is smaller. In addition, a step-out well could be drilled at a larger offset.

The invention has been described above with reference to a device that is conveyed on a wireline into the borehole. The method of the invention may also be used with a multicomponent induction logging device conveyed into a borehole on a tubular, such as a drillstring. The processing of the data may be done downhole using a downhole processor at a suitable location. It is also possible to store at least a part of the data downhole in a suitable memory device, in a compressed form if necessary. Upon subsequent retrieval of the memory device during tripping of the drillstring, the data may then be retrieved from the memory device and processed uphole.

It should be noted that while the invention may have been described above with reference to a 3DEX™ logging tool, this is not to be construed as a limitation. For example, U.S. patent application Ser. No. 11/489875 of Wang et al. discloses an arrangement in which formation resistivity measurements are obtained using an arrangement with just two axially oriented transmitters and two transverse receivers. The term "multicomponent" is intended to include all arrangements in which the transmitter and receiver coils are oriented in different directions.

Implicit in the control and processing of the data is the use of a computer program on a suitable machine readable medium that enables the processor to perform the control and processing. The machine readable medium may include ROMs, EPROMs, EEPROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of evaluating an earth formation, the method comprising:

making measurements with a logging tool having a first depth of investigation in a borehole in the earth formation;

estimating a first dip angle of the formation using the measurements;

comparing the estimated dip angle with a second dip angle measurement in the borehole; and storing results of the comparison on a tangible medium.

2. The method of claim 1 wherein making the measurements with the logging tool further comprises making measurements with a multicomponent logging tool.

3. The method of claim 1 further comprising:
(i) estimating a first azimuth of the formation using the measurements made by the logging tool, and
(ii) comparing the first azimuth with a second azimuth measurement made in the borehole.

4. The method of claim 3 further comprising estimating a ratio of a height of an undulation in the earth formation to a wave length of the undulation.

5. The method of claim 1 wherein the second dip measurement comprises a local dip measurement at the borehole.

6. The method of claim 5 further comprising making the second dip measurement using at least one of: (i) a borehole resistivity imaging tool, (ii) a density imaging tool, and (iii) a gamma ray imaging tool.

7. The method of claim 1 wherein the second dip measurement comprises a measurement made with a multicomponent logging tool having a second depth of investigation different from the first depth of investigation.

8. The method of claim 1 further comprising estimating at least one of (i) a dip angle of an unconformity in the formation, and (ii) an azimuth angle of an unconformity in the formation.

9. The method of claim 8 further comprising using an estimated horizontal resistivity and vertical resistivity of the formation for estimating at least one of: (i) a formation porosity, (ii) a fractional shale volume, (iii) a shale resistivity, (iv) a coarse-grained fraction of a laminated sequence, and (v) a fine-grained fraction of a laminated sequence.

10. The method of claim 8 further comprising using the estimated dip angle of the unconformity for drilling an offset well.

11. The method of claim 1 further comprising using the measurements made with the multicomponent logging tool for estimating at least one of: (i) a horizontal resistivity of the formation. (ii) a vertical resistivity of the formation, (iii) a dip angle of the formation, and (iv) an azimuth angle of the formation.

12. The method of claim 1 further comprising conveying the multicomponent logging tool into the borehole using one of: (i) a wireline, (ii) a drilling tubular, and (iii) a slickline.

13. The method of claim 1 further comprising making measurements with the logging tool during rotation of the logging tool.

14. An apparatus for evaluating an earth formation, the apparatus comprising:
a logging tool having a first depth of investigation configured to be conveyed in a borehole in the earth formation and make measurements of a property of the formation; and
a processor configured to:
(A) estimate a first dip angle of the formation using the measurements;
(B) compare the estimated dip with a second dip measurement in the borehole; and
(C) store results of the comparison on a tangible medium.

15. The apparatus of claim 14 wherein the logging tool comprises a multicomponent logging tool.

16. The apparatus of claim 14 wherein the processor is further configured to:
(i) estimate a first azimuth of the formation using the measurements made by the logging tool, and
(ii) compare the first azimuth with a second azimuth measurement made in the borehole.

17. The apparatus of claim 14 further comprising an imaging tool configured to make the second dip measurement.

18. The apparatus of claim 17 wherein the imaging tool is selected from the group consisting of: (i) a borehole resistivity imaging tool, (ii) a density imaging tool, and (iii) a gamma ray imaging tool.

19. The apparatus of claim 14 wherein the multicomponent logging tool is configured to have a second depth of investigation and wherein the second dip measurement comprises a measurement made with the multicomponent logging tool at the second depth of investigation different from the first depth of investigation.

20. The apparatus of claim 14 wherein the processor is further configured to determine a ratio of a height of an undulation in the earth formation to a wave length of the undulation.

21. The apparatus of claim 14 wherein the processor is further configured to estimate at least one of: (i) a dip angle of an unconformity in the formation, and (ii) an azimuth angle of an unconformity in the formation.

22. The apparatus of claim 21 wherein the processor is further configured to use the estimated dip angle of the unconformity for drilling an offset well.

23. The apparatus of claim 14 wherein the processor is further configured to use the measurements made with the multicomponent logging tool to estimate at least one of: (i) a horizontal resistivity of the formation, (ii) a vertical resistivity of the formation, (iii) a dip angle of the formation, and (iv) an azimuth angle of the formation.

24. The apparatus of claim 23 wherein the processor is further configured to use an estimated horizontal resistivity and vertical resistivity of the formation to estimate at least one of: (i) a formation porosity, (ii) a fractional shale volume, (iii) a shale resistivity, (iv) a coarse-grained fraction of a laminated sequence, and (v) a fine-grained fraction of a laminated sequence.

25. The apparatus of claim 14 further comprising a conveyance device configured to convey the multicomponent logging tool into the borehole, the conveyance device selected from the group consisting of: (i) a wireline, (ii) a drilling tubular, and (iii) a slickline.

26. A computer readable medium accessible to a processor, the computer-readable medium including instructions which enable
estimate a first dip of an earth formation using measurements from a logging tool conveyed in a borehole in the earth formation;
compare the estimated dip with a second dip estimated from an image of the earth formation; and
store results of the comparison on a tangible medium.

27. The medium of claim 26 further comprising at least one of: (i) a ROM, (ii) an EPROM, (iii) an EEPROM, (iv) a flash memory, and (v) an optical disk.

* * * * *